Figure 1:
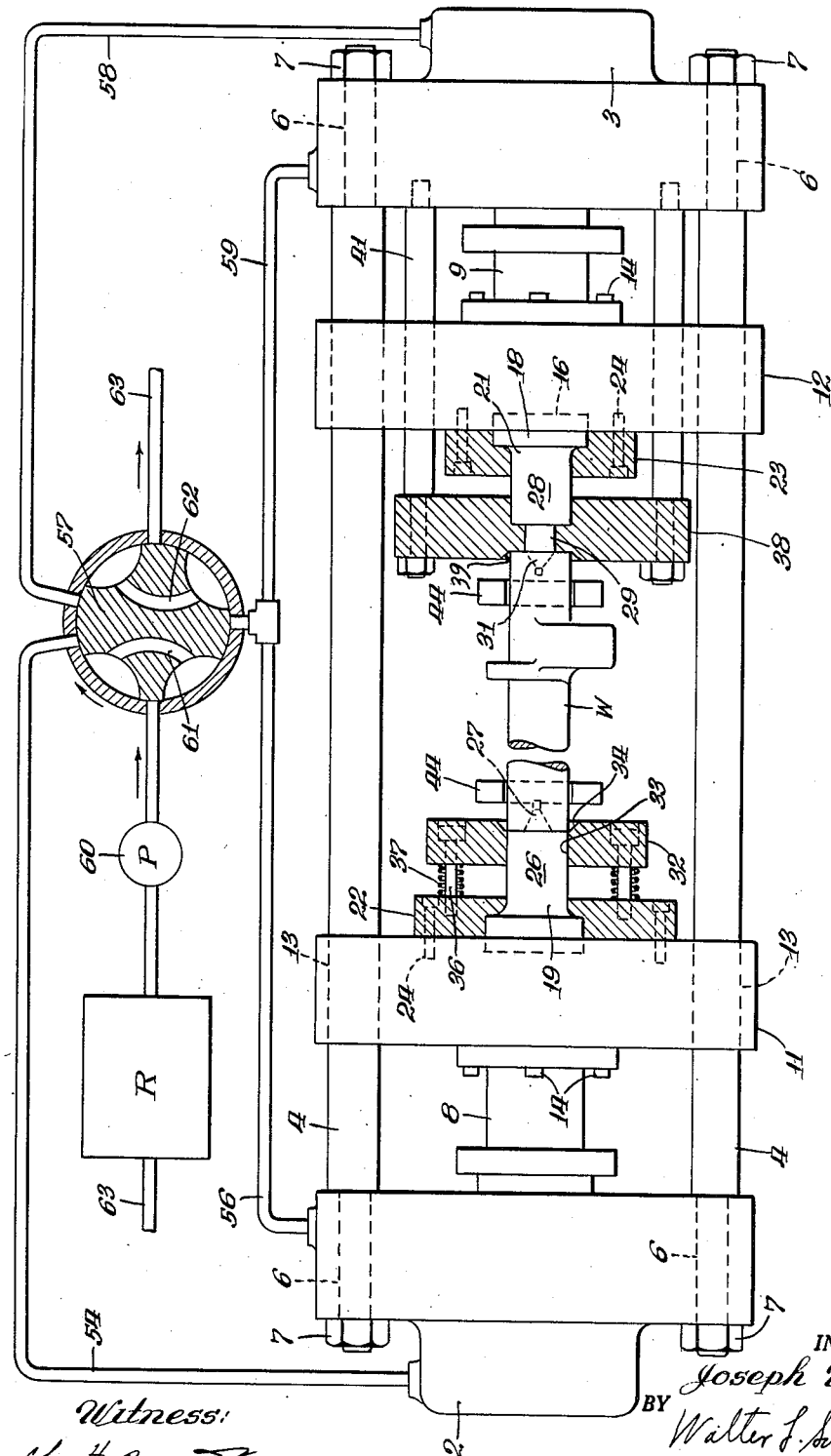

Oct. 8, 1957    J. W. TOMKA    2,808,885
CENTERING PRESS
Filed Sept. 7, 1955    2 Sheets-Sheet 1

INVENTOR.
Joseph W. Tomka
BY Walter F. Schlegel, Jr.
Atty.

Oct. 8, 1957

J. W. TOMKA 2,808,885

CENTERING PRESS

Filed Sept. 7, 1955

2 Sheets-Sheet 2

Witness:
Chas H Bassett

INVENTOR.
Joseph W. Tomka
BY
Walter S. Schlegel, Jr.
Atty.

United States Patent Office 2,808,885
Patented Oct. 8, 1957

2,808,885

CENTERING PRESS

Joseph W. Tomka, Cincinnati, Ohio, assignor to American Steel Foundries, Chicago, Ill., a corporation of New Jersey Application September 7, 1955, Serial No. 532,844

8 Claims. (Cl. 164—95)

This invention relates to an apparatus adapted for use in forming coaxial center holes in opposite ends of work pieces which are to be subsequently mounted between center points of a lathe.

Heretofore, work pieces to be mounted in a lathe have been formed with center holes by means of conventional center drills. It is also well known to those skilled in this art that the chucking of the work pieces and drilling of the center holes involves considerable time and expense, and further that the center holes were not always of proper uniform depth to receive the center points of a lathe, thereby resulting in excessive wear and breakage of the pointed ends of the center points. In the drilling of center holes in the ends of some types of work pieces by the use of a single center drill, the center holes are often not in axial alignment as the work piece is chucked for the drilling of one end thereof and then rechucked for the drilling of the opposite end.

An object of the present invention resides in the provision of a centering apparatus embodying coaxial punches movable relative to each other to press center holes in opposite ends of a work piece.

Another object of the invention resides in the provision of a centering apparatus embodying means for supporting and automatically centering a work piece between the center punches.

A further object of the invention resides in the provision of a centering apparatus in which the center hole punches are supported for reciprocative movement toward and away from each other in axial alignment, the punches being secured on individual carriages slidably mounted on common guide means.

Another object of the invention resides in the provision of hydraulic power means including cylinders and rams for reciprocating their respective punch carriages, the cylinders being secured to opposite ends of the carriage guide means and being of different capacity.

Another object of the invention resides in the provision of means for automatically ejecting a work piece from the centering apparatus at the completion of the centering operation, said means including a work piece support movable to transfer a work piece thereon onto a chute leading to a tote box.

Figure 2:
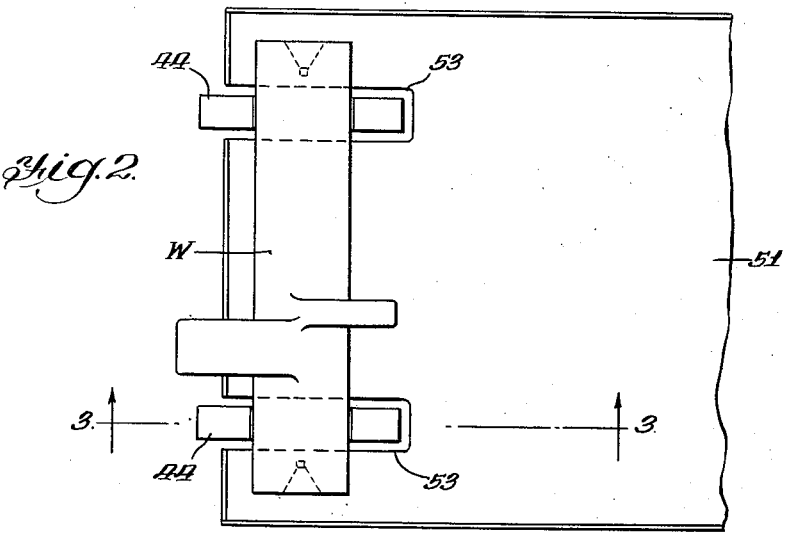
Figure 3:
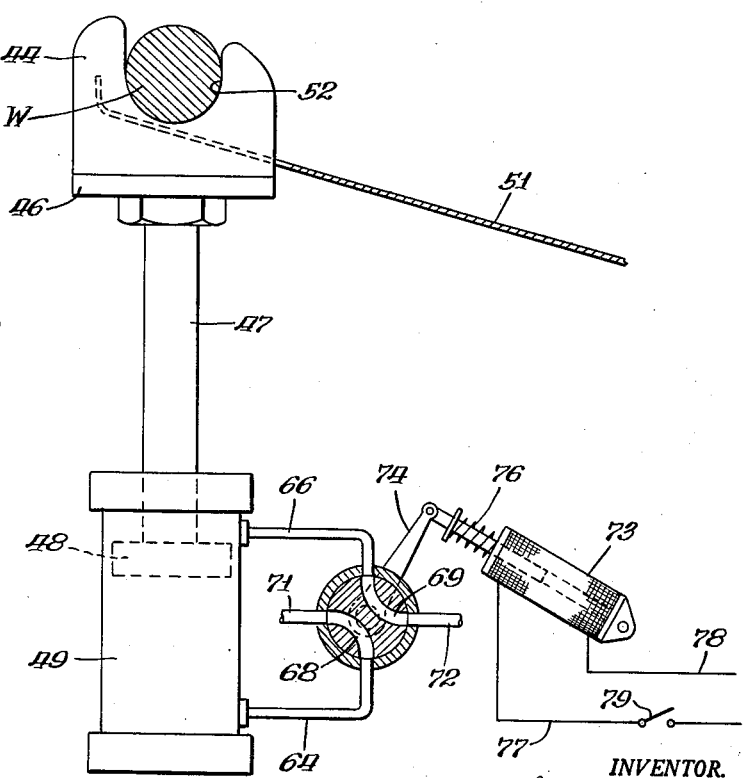

The invention embodies other novel features, details of construction and arrangement of parts which are hereinafter set forth in the specification and claims and illustrated in the accompanying drawing, wherein:

Figure 1 is a top plan view, partly in cross section, illustrating a centering apparatus embodying features of the invention, the center hole punches being shown in their forward or final positions at the completion of the centering operation, Figure 2 is a detail top plan view illustrating the work piece supporting and ejecting means provided for the centering apparatus, Figure 3 is a transverse sectional view taken along the line 3—3 of Figure 2.

Referring now to the drawing for a better understanding of the invention, the centering apparatus is shown as comprising a primary cylinder 2 and a secondary cylinder 3 interconnected by carriage guide means, such as rods 4 which are formed with reduced end portions 6 to extend through apertures in the cylinders and threaded to receive nuts 7.

The cylinders 2 and 3 are formed with coaxial bores to slidably receive conventional rams 8 and 9, respectively. Carriages 11 and 12 are formed with bearing openings 13 to slidably receive the guide rods 4 and are secured to the rams 8 and 9, respectively, by means of cap screws 14.

The adjacent opposing faces of the carriages 11 and 12 are provided with hardened steel inserts 16 to serve as seats to engage the bases 17 and 18 of coaxial center hole punches 19 and 21, respectively. The punches 19 and 21 are secured to their respective carriages 11 and 12 by means of punch holders 22 and 23, respectively, and cap screws 24.

The punch 19 is formed with a cylindrical body portion 26 and a generally conical end portion 27. The punch 21 is formed with a cylindrical body portion 28, a reduced diameter neck portion 29, and a generally conical end portion 31. The end portions 27 and 31 of the punches 19 and 21, respectively, are of suitable size and shape to form conventional center holes in the ends of a work piece W engaged therebetween.

A movable work piece centering plate 32 is formed with a cylindrical bore 33 to snugly slidably receive the body 26 of the punch 19, the forward end of the bore merging with a frusto-conical work centering seat 34. Cap screws 36 extend through openings in the centering plate 32 for threaded engagement with the punch holder 22, and compression springs 37 are mounted on the screws between the plate and holder to yieldably resist axial movement of the plate toward the holder.

A fixed work piece centering plate 38 is formed with coaxial bores to slidably receive the body 28 and neck portion 29 of the punch 21, the front face of the plate having a frusto-conical work centering seat 39 coaxial with the punch. To secure the plate 38 in fixed position, studs 41 are threaded into the cylinder 3 and provided with reduced end portions 42 to extend through apertures in the plate and to be secured thereto by nuts 43.

A work piece supporting and ejecting device is provided for the centering apparatus and is shown as comprising a pair of spaced saddles 44—44 secured to a cross bar 46 supported upon the upper end of a piston rod 47. The piston rod is secured to a piston 48 mounted for reciprocative movement in an air cylinder 49 to alternately raise and lower the saddles 44—44 relative to a fixed unloading chute 51. The saddles are formed with recesses 52 at their upper ends to receive and support a work piece W in axial alignment with the punches 19 and 21 and above the chute 51, the chute being formed with slots 53—53 for the passage of the saddles.

Pipes 54 and 56 lead from opposite ends of the cylinder 2 to a control valve 57, and pipes 58 and 59 lead from opposite ends of the cylinder 3 to the control valve. A pump 60 is provided to deliver liquid under pressure from a reservoir R to the cylinders 2 and 3 under control of the valve 57. The valve may be manually operated to direct liquid under pressure through the passageway 61 and conduits 54 and 58 into the outer ends of the cylinders 2 and 3 to move the rams 8 and 9 toward each other, or the valve may be operated to direct fluid under pressure through the passageway 61 and conduits 56 and 59 to the inner adjacent ends of the cylinders to move the rams away from each other back to their normal starting positions. During movement of liquid through the valve passageway 61 to the cylinders, liquid is returned from the cylinders to the reservoir through the valve passageway 62 and conduit 63.

Air under pressure is directed into the ends of the cylinder 49 through conduits 64 and 66 under the control of a valve 67 provided with passageways 68 and 69. Compressed air is directed from a suitable source through a conduit 71 to the valve 67, and air passing from the cylinder 49 to the valve is exhausted to the atmosphere through conduit 72.

A solenoid 73 is provided to move the valve lever 74 in one direction, and a compression spring 76 is provided to return the valve lever to its normal position illustrated in Figure 3. The solenoid 73 is connected by leads 77 and 78 to a suitable source of current and is energized responsive to closing of a switch 79 during retraction or rearward movement of the carriages 11 and 12.

In the operation of the apparatus to form center holes in opposite ends of a work piece W, the carriages 11 and 13 are in their retracted positions to permit a work piece to be manually positioned upon the saddles 44—44 above the chute 51. By slowly rotating the valve 57 in a clockwise direction, as illustrated in Figure 1, liquid under pressure first passes from the pump 60 through passageway 61 and thence through conduit 54 into the back end of the primary cylinder 2 to move the ram 8 and carriage 11 forwardly to first cause the ends of the work piece to be engaged between and centered by the frusto-conical seats 34 and 39 formed on the centering plates 32 and 38, respectively. Upon further forward movement of the ram 8, the centering plate 32 retracts relative to the carriage 11 and the conical end portion 27 of the punch 19 is pressed into the end of the work piece to form a center hole therein. During such forward movement of the rams 8 and 9, liquid within the forward ends of the cylinder 2 is returned to the reservoir R through conduits 56 and 59, valve passageway 62 and conduit 63.

By continuing the movement of the valve 57 in a clockwise direction, liquid under pressure is also delivered from the pump 60 through the passageway 61 and conduit 58 into the back end of the secondary cylinder 3 to cause the ram 9 to move in a forward direction to force the conical end portion 31 of the punch 21 into the end of the work piece adjacent thereto. The force exerted by the ram 8 is preferably greater than the force exerted by the ram 9 to prevent axial movement of the work piece W during engagement of the end portion 31 therewith. It will be noted that penetration of the end portions 27 and 31 into the ends of the work piece is uniform and predetermined due to abutting engagement of the ends of the punch bodies 26 and 28 with the work piece W and fixed plate 38, respectively.

After the center holes have thus been formed in the work piece W, the valve 57 is rotated in a counterclockwise direction to direct liquid under pressure from the pump 60 through passageway 61 and conduits 56 and 59 into the forward ends of the cylinders 2 and 3 to retract the rams 8 and 9 and their respective carriages 11 and 12. During such return movement of the rams 8 and 9, liquid within the back ends of the cylinders is returned to the reservoir R through conduits 54 and 58, valve passageway 62 and conduit 63.

As the rams 8 and 9 and their respective carriages 11 and 12 aproach their rearward starting positions, the switch 79 is automatically closed responsive to such movement to close the circuit from a source of current through leads 77 and 78 to energize the solenoid 73 which then acts through the valve actuating arm 74 to move the valve passageway 68 into registry with the air inlet conduit 71 and conduit 66 to cause the piston 48 to move downwardly through the cylinder 49. During downward movement of the piston 48, the air within the lower end of the cylinder 49 is exhausted to the atmosphere through conduit 64, valve passageway 69 and conduit 72. As the saddles 44—44 move downwardly below through the slots 53—53 in the chute 51, the work piece W is thereby transferred from the saddles onto the chute and moves downwardly by gravity into a tote box for delivery to a lathe for machining operations.

Upon opening of the switch 79, the spring 76 acts to move the valve 67 to the position illustrated in Figure 3 in the drawings whereby air under pressure is directed through the conduit 71, passageway 68 and conduit 64 into the lower end of the cylinder 49 to raise the piston 48 and saddles 44—44 to their work supporting positions.

I claim:

1. A hydraulic press structure for forming coaxial center holes in a work piece, comprising a first and second power means each including a cylinder and a ram axially aligned with the other, a centering plate on the first ram movable axially and spring biased toward the other, a fixed centering plate on the second cylinder, center punches on said rams projecting through apertures in said centering plate, and control means for effecting actuation of the first ram and sequentially thereto the second ram.

2. A hydraulic press for forming coaxial center holes in a work piece, comprising a pair of power means disposed axially opposite, each having a centering plate one being axially yieldable and the other fixed, center punches projecting through apertures in the centering plates, and control means for sequentially effecting movement of the centering plates relatively toward each other, then inward movement of the punch associated with the movable centering plate, and then inward movement of the other punch.

3. A hydraulic press for forming coaxial center holes in a work piece, comprising a primary and a secondary power means including a cylinder for each mounted on interconnecting means spacing them in predetermined relative positions, a ram in said primary cylinder having a center punch and a centering plate encompassing the punch spring biased axially to a normal position beyond the punch and axially yieldable for effectively projecting the punch through and beyond the plate, a centering plate fixed on the secondary cylinder, a center punch on the secondary ram projectable through the associated centering plate, and means for operating said rams.

4. The construction of claim 3 in which the primary power means is of greater power than the secondary power means.

5. A hydraulic press for forming coaxial center holes in a work piece, comprising a primary and a secondary power means each including a cylinder and ram axially aligned with the cylinder and ram in the other, guide means interconnecting said cylinders and guiding said rams, a center punch on the primary ram, a centering plate on the primary ram surrounding the associated punch and spring biased forwardly to a normal position beyond the punch and yieldable therefrom to expose the punch forwardly therethrough, a centering plate fixed on the secondary cylinder and disposed forwardly of the associated secondary ram and constituting limiting means, acting through the work piece, for the primary punch in movement toward the secondary power means, a center punch on the secondary ram projectable through an aperture in the associated fixed centering plate, and means for operating said rams.

6. The construction of claim 5 in which the fixed secondary centering plate also constitutes limiting means for movement of the secondary ram toward the primary power means.

7. A hydraulic press for forming coaxial center holes in a work piece, comprising a primary and a secondary power means each including a cylinder and ram axially aligned, guide means interconnecting said cylinders and guiding said rams, a center punch on the primary ram, a centering plate on the primary ram surrounding the associated punch and spring biased forwardly to a normal position beyond the punch and yieldable therefrom to expose the punch forwardly therethrough, a centering plate fixed on the secondary cylinder and disposed forwardly of the associated secondary ram and constituting limiting means, acting through the work piece, for the primary punch in movement toward the secondary power means, a center punch on the secondary ram projectable through an aperture in the associated fixed centering plate, said primary power means being of greater power than the secondary power means, and hydraulic control and operating means for operating said rams including a valve movable sequentially from a first "off" position, to a second position connecting the first power means to the operating means, to a third position connecting both power means to the operating means.

8. A hydraulic press for forming coaxial center holes in a work piece, comprising a pair of power means disposed axially opposite, each having a centering plate one being axially yieldable and the other fixed, center punches projecting through apertures in the centering plates, and control means for effecting movement of the centering plates relatively toward each other, and then inward movement of the punches toward each other.

References Cited in the file of this patent

UNITED STATES PATENTS

| | | |
|---|---|---|
| 100,772 | Kelly | Mar. 15, 1870 |
| 311,619 | Varnum | Feb. 3, 1885 |
| 469,784 | Hall | Mar. 1, 1892 |
| 521,206 | Covel | June 12, 1894 |
| 757,950 | McElwain | Apr. 19, 1904 |
| 922,392 | Christianson | May 18, 1909 |
| 998,565 | Cole | July 18, 1911 |
| 1,058,940 | Binns | Apr. 15, 1913 |
| 1,243,053 | Dieter | Oct. 16, 1917 |
| 1,397,990 | Thompson | Nov. 22, 1921 |
| 2,194,125 | Rinehart | Mar. 19, 1940 |
| 2,367,242 | Stacy | Jan. 16, 1945 |
| 2,501,685 | Lev | Mar. 28, 1950 |
| 2,518,086 | Snorek | Aug. 8, 1950 |
| 2,605,842 | Horton | Aug. 5, 1952 |